United States Patent
Armstrong-Poston et al.

(10) Patent No.: US 6,653,425 B1
(45) Date of Patent: Nov. 25, 2003

(54) HIGH REFRACTIVE INDEX AND HIGH PHOTOSENSITIVE OPTICAL MATERIALS AND METHOD FOR PREPARING THE SAME

(75) Inventors: Eyerce L. Armstrong-Poston, Corning, NY (US); Paul J. Shustack, Elmira, NY (US); Jianguo Wang, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/306,280

(22) Filed: Nov. 27, 2002

(51) Int. Cl.$^7$ ................................................. C08F 12/30
(52) U.S. Cl. .................... 526/289; 526/286; 526/303.1; 526/328.5; 526/332; 526/336; 526/347
(58) Field of Search ................................. 526/286, 289, 526/303.1, 328.5, 332, 336, 347

(56) References Cited

PUBLICATIONS

Harris et al. Polymer Preprints (ACS, Div. of Polymer Chemistry)(1988), 29(2), 306–7.*
Wilbur, Kr. et al. Journal of polymer Science, part A: Polymer Chemistry (1990), 28(13), 3747–59.*
"The Polarisabilities of Bonds –I." K. G. Denbigh, Trans. Faraday Soc., 36, 936 (1940).
"Addition polymerization of 1,4–diethynylbenzene with 1,4–benzenedithiol and properties of the resulting copolymer" E. Kobayashi, et al., J. Makromol. Chem., vol. 3. (Elsevieor, London 1993) pp 2525–2533.
"Novel sulfur–containing telechelics with alternating aliphathic–aromatic structure units" O. Nuyken, et al. Polymer Bullitin, 19, 371–375 (1988).
"Polyaddition of Diallenes: Radical Polyaddition of Dithiols to 1,4–Bis(allenyoxy)benzene" E. Sato, et al, Macromolecules 1993, 26, 5185–5186.
"Radical Polyaddition of Dithiols to Bis(alkoxyallene)s" E. Sato, et Macromolecules, 1993, 26, 5187–5191.
"Free Radical Addition of Thiophenol to 3–Substituted 1–Alkyne with or without Migration of the Substituents", H. Miyake, et al, The Chemical Society of Japan, 1988, vol. 61, No. 10.
"Untersuchungen zur Thiol/En–Polymersation: elektronen-spinresonanzspektroskopischer Nachweis spontaner Radikalbildung", S. Senfuss, et al. Makromol. Chem. 192, 2895–2900 (1991).
"Thiol–Ene Photopolymers" A.F. Jacobine, Polymer. Sci. Technol. (1993), 3, 219–268 (Elsevier, London UK).

* cited by examiner

Primary Examiner—Helen L. Pezzuto
(74) Attorney, Agent, or Firm—Walter M. Douglas

(57) ABSTRACT

The invention is directed to the preparation of vinyl sulfide compounds of general formula —$(-R_1-S-R_4C=CR_5-R_3-S-)_n-(-R_2-S-R_4C=CR_5-R_3-S-)_m$, where m and n are integers in the range of 1–1000, are formed by the addition of a dithiol compound of general formula HS—$R_1$—SH to an acetylenic compound of general formula HC≡C—$R_3$—S—$R_2$≡S—$R_3$—C—$CH_2$. These vinyl sulfide compounds can be homopolymerized or copolymerized with second monomers, oligomers or polymers that are capable of reacting with their carbon-carbon double bond. The vinyl sulfide compounds have a high refractive index (1.60 or higher at 632 nm) and can be used to make optical telecommunication elements and devices. They are soluble in selected solvents and such solutions can be applied to substrates by various methods such as spin coating, dipping, spraying and other methods known in the art.

17 Claims, 5 Drawing Sheets

FIG. 1 FTIR spectra of BPTPS and its polymer with MPS

VP 12.0  GT 9.0  VS 427.4

HIGH REFRACTIVE INDEX AND HIGH PHOTOSENSITIVE OPTICAL MATERIALS AND METHOD FOR PREPARING THE SAME

FIELD OF THE INVENTION

The present application relates generally to polymerizable alkene-sulfide compounds and to a method of preparing such compounds from acetylenic compounds. In particular, the invention is directed to photosensitive polymerizable alkene-sulfide compounds that can be used to form polymeric materials having a refractive index greater than 1.60 that can be used to make optical elements and devices useful in optical telecommunications.

BACKGROUND OF THE INVENTION

The refractive index (n) of a polymer is defined as the ratio of the velocity of light in a vacuum (c) to the velocity of light in the polymer material (v) at a certain wavelength ($\lambda$). According to the Maxwell equation (1), the refractive index is the ratio of magnetic field strength (H) with electric field strength (E), which increases with the polarizability ($\chi$) of the molecules.

$$n = \frac{H}{E} = \sqrt{1 + 4\pi\chi} \cong 1 + 2\pi\chi \quad (1)$$

For a covalent bonded polymer system, the refractive index can be treated as the sum of the bond refractions that make up the repeat unit of the polymer chain [K. G. Denbigh, Trans. Faraday Soc. 36 (1940), 936]. Thus, a polymer structure constructed from polarizable larger size building blocks (or elements) such as Br, I, S, Se, phenyl groups, etc. often have a higher refractive index. In contrast, the less polarizable chemical bonds in a fluorinated polymer depress the refractive index.

Most of the high refractive index compounds from inorganic or organic/inorganic hybrid materials are chemically bonded by ionic interaction. The poor hydrolytic stability caused by their high dipole moment combined with their higher optical loss limits the application of many high refractive index materials in the telecommunication industry. In comparison with traditional inorganic glass and ceramic materials, polymer materials, which are covalently bonded macromolecules, exhibit unique mechanical, processing and optical properties. High refractive index. ("RI") polymer materials (RI>1.60 at 632 nm) have been used as plastic lenses to replace the heavy inorganic glass lens in our daily life. In the optical communication industry, high refractive index polymer materials have been applied in specialty optical fiber; for example, erbium doped amplify fiber (EDAF) as an outer cladding layer to strip the cladding modes. In tunable polymer Bragg grating filter devices, an alternating high and low index periodic structure is the key to achieving a thermally tunable grating for wavelength selective switches.

The optical switch is one of the most important components in the optical network. Among the different designs of optical switches are the thermal optical, electro-mechanical, electro-optical, and liquid crystal switches. The liquid crystal optical switch is a niche device known for its fast switch time and possibly lower fabrication processing cost. In the design of a high efficient liquid crystal switch, the polarizing splitter and combiner require a high refractive index waveguide (1.68–1.72 at 1550 nm) to match the refractive index of the liquid crystal molecules which normally contain ridged rod moieties of high refractive index phenyl groups. Many such materials contain urethane or epoxy groups that are used for crosslinking the polymers forming the rigid rods. Materials containing urethane or epoxy groups are not suitable for optical coatings or for use in optical waveguide applications because of high optical losses due to the presence NH or OH groups. Much more desirable are materials that do not contain such NH and OH groups.

Thiol-ene chemistry, the reaction between an alkene compound and a thiol compound, has been extensively used for polymer modification and rubber crosslinking. [Kobayashi et al., *J. Makromol. Chem.* Vol. 3 (Elsevier, London 1993), 2525–2533]. The mechanism of thiol-ene is well known as a radical addition reaction. The thiol-ene reaction may be viewed as ultimately being the addition of a —SH moiety across an alkene double bond, resulting in a saturated product. Less well known is the analogous reaction between an alkyne (an acetylenic compound) and a thiol (that is, "thiol-yne" chemistry). Dithio compounds and (phenyl)-diynes have been reported to yield polysulfide containing polymers that are insoluble in any organic solvent. [Oskar Nuyken et al., "Novel Sulfur-containing telechelices with alternating aliphatic-aromatic structure units", *Polymer Bulletin* 19 (1998), 371]. Such compounds, which are solids, are unsuitable for use in telecommunication applications because of their inability to be coated onto substrates. In order to be used as a coating material such compounds must either be a liquid of suitable viscosity or soluble in a selected solvent. Under special conditions such as UV radiation, a soluble polymer has been reported from the reaction of a dithiol with a diallene compound (I) [HC=C=CH—O—C$_6$H$_4$—O—CH=C=CH$_2$ (I)⇆HC≡C—CH$_2$—O—C$_6$H$_4$—O—CH$_2$—C≡CH (II)] formed from the dialkyne (II) to yield Anti-Markovnikov products. [E. Sato et al., "Polyaddition of diallenes: radical polyaddition of dithiols to 1,4-bis(allenyloxy)benzene", *Macromolecules* 26, No. 19, (1998), 5185–5186 and 5187–5191.] However, overall, the chemical literature does not disclose generally useful methods for reacting alkynes and thiols to prepare compounds having polymerizable double bonds which can be used as-is to coat substrates for telecommunications applications, or which are soluble in selected solvents so that they can be used for such purposes.

The preparation of reactive alkenes having sulfur atoms attached to at least one of the carbon atoms of the double bond would be highly desirous for use in the preparation of polymeric materials having a high refractive index and low losses.

SUMMARY OF THE INVENTION

The invention is directed to the preparation of vinyl sulfide compounds of general formula —(—R$_1$—S—R$_4$C=CR$_5$—R$_3$—S—)$_n$—(—R$_2$—S—R$_4$C=CR$_5$—R$_3$—S—)$_m$ formed by the Markovnikov ("MK") or anti-Markovnikov ("AMK") addition of a dithiol compound of general formula HS—R$_1$—SH with an acetylenic compound of general formula R$_4$(or R$_5$)C≡C—R$_3$—S—R$_2$—S—R$_3$—C≡CR$_4$(or R$_5$); where:

(1) R$_1$ and R$_2$, independently of each other and of R$_3$, are an alkyl group, an aryl group, a dialkyl sulfide group (-alkyl-S-alkyl-), a diaryl sulfide group (-aryl-S-aryl-) or a mixed alkyl-aryl sulfide group (-alkyl-S-aryl-), the R$_1$ and R$_2$ alkyl groups being C$_1$–C$_6$ alkyl groups selected independently of each other, and the aryl groups being phenyl and alkyl, deuterium or halogen substituted phenyl groups;

(2) $R_3$ is methylene (—$CH_2$—) or a mono-/di-substituted methylene group wherein said substituent(s) is/are, independently, $C_1$–$C_6$ alkyl groups;

(3) $R_4$ and $R_5$, independently of each other, are H or $CH_3$; and (4) m and n, independently of each other, are integers in the range of 1–1000, and preferably in the range of 1–100.

The invention is further directed to a method of preparing compounds of general formula —(—$R_1$—S—$R_4$C=$CR_5$—$R_3$—S—)$_n$—(—$R_2$—S—$R_4$C=$CR_5$—$R_3$—S—)$_m$.

In addition, the invention is directed to monomeric compounds of general formula $R_4$(or $R_5$)C≡C—$R_3$—S—$R_2$—S—$R_3$—C≡C $R_4$(or $r_5$) and to a method of preparing such compounds by the reaction of a halogenated acetylenic compound of general formula $R_4$(or $R_5$)C≡C—$R_3$X with a dithiol compound of general formula HS—$R_2$—SH, where:

(1) $R_2$ is an alkyl group, an aryl group, a dialkyl sulfide group (-alkyl-S-alkyl-), an aryl sulfide group (-aryl-S-aryl-), or a mixed alkyl-aryl sulfide group (-alkyl-S-aryl-); the alkyl groups being $C_1$–$C_6$ alkyl groups selected independently of each and the aryl groups being phenyl and alkyl, deuterium or halogen substituted phenyl groups;

(2) $R_3$ is a methylene (—$CH_2$—) or a mono-/di-substituted methylene group wherein said substituent(s) is/are, independently, $C_1$–$C_6$ alkyl groups; and (3) $R_4$ and $R_5$, independently of each other, are H or $CH_3$.

The invention is also directed to polymeric materials obtained by (a) the homopolymerization of compounds of compounds of general formula —(—$R_1$—S—$R_4$C=$CR_5$—$R_3$—S—)$_n$—(—$R_2$—S—$R_4$C=$CR_5$—$R_3$—S—)$_m$ and (b) the copolymerization of compounds of general formula —(—$R_1$—S—$R_4$C=$CR_5$—$R_3$—S—)$_n$—(—$R_2$—S—$R_4$C=$CR_5$—$R_3$—S—)$_m$ with monomers and oligomers containing polymerizable —C=C— groups, including acrylate and methacrylate monomers and oligomers.

It is to be understood that both the foregoing general description and the following detailed description present embodiments of the invention, and are intended to provide an overview or framework for understanding the nature and character of the invention as it is claimed.

DETAILED DESCRIPTION OF THE INVENTION

Figure 1:
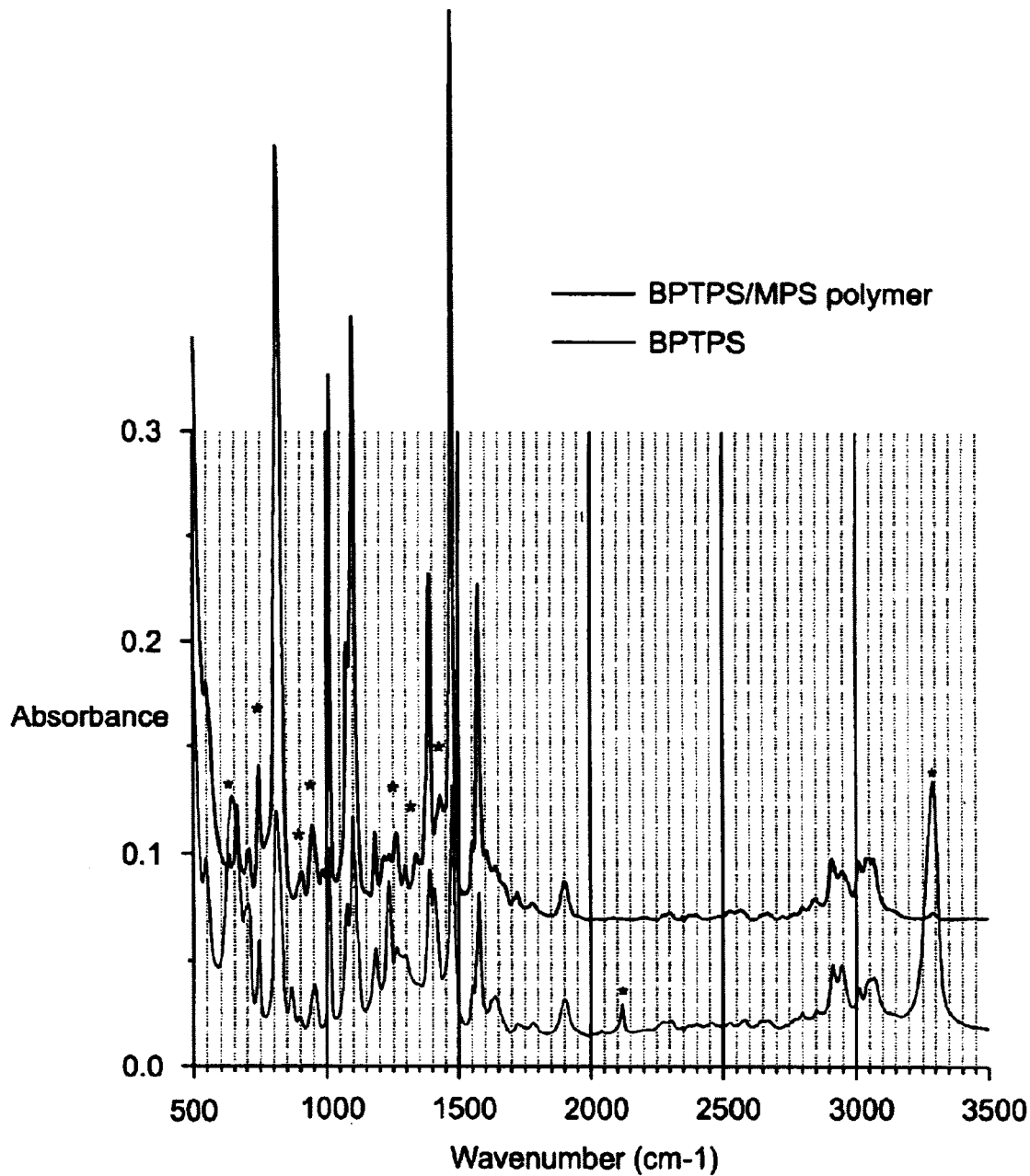
FIG. 1 illustrates the FTIR spectrum of BPTPS and the polymer formed by reaction of BPTPS and MPS.

The invention is directed to the preparation of vinyl sulfide compounds of general formula —(—$R_1$—S—$R_4$C=$CR_5$—$R_3$—S—)$_n$—(—$R_2$—S—$R_4$C=$CR_5$—$R_3$—S—)$_m$ formed by the Markovnikov or anti-Markovnikov addition of a dithiol compound of general formula HS—$R_1$—SH with an acetylenic compound of general formula $R_4$(or $R_5$)C≡C—$R_3$—S—$R_2$—S—$R_3$—C≡$CR_4$(or $R_5$); where:

(1) $R_1$ and $R_2$, independently of each other and of $R_3$, are an alkyl group, an aryl group, a dialkyl sulfide group (-alkyl-S-alkyl-), a diaryl sulfide group (-aryl-S-aryl-) or a mixed alkyl-aryl sulfide group (-alkyl-S-aryl-), the $R_1$ and $R_2$ alkyl groups being $C_1$–$C_6$ alkyl groups selected independently of each other, and the aryl groups being phenyl and alkyl, deuterium or halogen substituted phenyl groups;

(2) $R_3$ is methylene (—$CH_2$—) or a mono-/di-substituted methylene group wherein said substituent(s) is/are, independently, $C_1$–$C_6$ alkyl groups;

(3) $R_4$ and $R_5$, independently of each other, are H or $CH_3$; and (4) m and n, independently of each other, are integers in the range of 1–1000, and preferably in the range of 1–100.

The vinyl sulfide compounds of the invention have been found to have a refractive index greater than 1.60 at 632 nm which makes them useful for various telecommunications applications requiring high refractive index polymeric materials. Specifically included in the compounds of formula —(—$R_1$—S—$R_4$C=$CR_5$—$R_3$—S—)$_n$—(—$R_2$—S—$R_4$C=$CR_5$—$R_3$—S—)$_m$ are compounds of formula —(—$R_1$—S—HC=CH—$R_3$—S—)$_n$—(—$R_2$—S—$R_4$C=$CR_5$—$R_3$—S—)$_m$ and compounds of formula —(—$R_1$—S—HC=CH—$R_3$—S—)$_n$—(—$R_2$—S—HC=CH—$R_3$—S—)$_m$.

The $C_1$–$C_6$ alkyl: groups $R_1$ and $R_2$ may be linear or branched alkyl groups; for example, without limitation, propyl, isopropyl, butyl, isobutyl, pentyl, isopentyl, neopentyl and similar alkyl groups; and deuterium or halogen containing analogs thereof. $R_3$ is a methylene group or a substituted methylene group wherein one or both of the methylene hydrogen atoms has been replaced by linear or branched chain $C_1$–$C_6$ alkyl group, with replacement by methyl groups being preferred.

The compounds of general formula $R_4$(or $R_5$)C≡C—$R_3$—S—$R_2$—S—$R_3$—C≡$CR_4$(or $R_5$) are prepared by the reaction of a halogenated acetylenic compound of general formula $R_4$(or $R_5$)C≡C—$R_3$X with a dithiol compound of general formula HS—$R_2$—SH. In the acetylenic compounds of formula $R_4$(or $R_5$)C≡C—$R_3$X, X is Cl or Br and $R_3$ is a methylene group or alkyl-substituted methylene group in which one or both of the methylene hydrogen atoms has been replaced by a linear or branched chain $C_1$–$C_6$ alkyl group. Examples, without limitation, of $C_1$–$C_6$ alkyl groups are methyl, ethyl, propyl, isopropyl, isobutyl, neopentyl, cyclohexyl, isohexyl and similar alkyl groups. Further, when preparing compounds of formula $R_4$(or $R_5$)C≡C—$R_3$—S—$R_2$—S—$R_3$—C≡$CR_4$(or $R_5$), one may use two, or more, different acetylenic compounds of formula $R_4$(or $R_5$)C≡C≡$R_3$X in the reaction. For example, one can react a mixture consisting of HC≡C—$CH_2$X and HC≡C—CH($CH_3$)X, or a mixture consisting of $CH_3$—C≡C—$CH_2$X and HC≡C—H($CH_3$)X, or a mixture consisting of $CH_3$—C≡C—$CH_2$X and HC≡C—CH($C_3H_7$)X, or a mixture $CH_3$—C≡C—$CH_2$X and HC≡C—C($CH_3$)$_2$X and similar mixtures within the scope of what is closed herein.

In the dithiol compounds of formula HS—$R_2$—SH, $R_2$ is an alkyl group, an aryl group, a dialkyl sulfide group (-alkyl-S-alkyl-), an aryl sulfide group (-aryl-S-aryl-), or a mixed alkyl-aryl sulfide group (-alkyl-S-aryl-); the alkyl groups of $R_2$ being $C_1$–$C_6$ alkyl groups selected independently of each, and the aryl groups being phenyl and alkyl, deuterium or halogen substituted phenyl groups selected independently of each other. The halogen atoms are preferably chlorine and fluorine. Chlorine is preferred for high refractive index materials. Since fluorinated species tend to decrease the refractive index, it is used for refractive index attenuation. Examples of such HS—$R_2$—SH compounds, without limitation, are 1,4-, 1,2- and 1,3-benzenedithiol; bis(4-mercaptophenyl)sulfide; bis(3-mercaptophenyl)-sulfide; 1,5-dimercaptopentane; bis(5-mercaptopentyl) sulfide; 1,4-, 1,3- and 1,2-dimercaptocyclohexane; bis(4-mercaptocyclo-hexyl)sulfide; 2,3,5,6-tetrachlorobenzene-1,4-dithiol; 2,6-dichlorobenzene-1,4-dithiol; bis(4-mercapto-2,3,5,6-tetrachlorophenyl)sulfide; 3,5,6-tetrafluorobenzene-1,4-dithiol; 2,6-difluorobenzene-1,4-dithiol 1,3-dimercaptopropane; bis(3-mercaptopropyl)sulfide; (4-mercaptophenyl-3-mercaptopropyl)sulfide; (4-mercapto-cyclohexyl-3-mercaptopropyl)sulfide and similar compounds known in the art.

Generally, the compounds of formula $R_4$(or $R_5$)C≡C—$R_3$—S—$R_2$—S—$R_3$—C≡C$R_4$(or $R_5$) are prepared by reacting the halogenated acetylenic compound and the dithiol compound under nitrogen in a selected solvent or solvent mixture in the presence of a selected amine compound at a temperature in the range of 18–70° C. for a time in the range of 8–24 hours. Ethereal solvents such as tetrahydrofuran, glyme, and diglyme are preferred. The reaction is quenched by addition of the reaction mixture to chilled water, for example, ice water. The aqueous mixture is then set in a freezer or otherwise kept cold for a time sufficient to allow the aqueous and organic layers to separate. The organic layer is separated, washed with deionized water and dried with a drying agent such as magnesium sulfate, and evaporated to dryness. The crude product is dissolved in a selected solvent, passed through a silica gel column, and again evaporated to dryness and recrystallized from a selected solvent.

Vinyl sulfide compounds of general formula —(—$R_1$—S—$R_4$C═C$R_5$—$R_3$—S—)$_n$—(—$R_2$-S—$R_4$C═C$R_5$—$R_3$—S—)$_m$ are prepared by the reaction of the diacetylene compounds of formula HC≡C—$R_3$—S—$R_2$—S—$R_3$—C≡CH$_2$ with a dithiol compound of general formula HS—$R_1$—SH. The subscripts m and n are integers in the range of 2–1000, and preferably in the range of 2–100. HS—$R_1$—SH is selected from the same groups of compounds as HS—$R_2$—SH, and $R_1$ may be the same or different from $R_2$. Generally, equimolar amounts of HC≡C—$R_3$—S—$R_2$—S—$R_3$-C≡CH$_2$ and HS—$R_1$—SH are dissolved in a selected solvent, placed in a reaction vessel and degassed using nitrogen. A selected polymerization initiator in an amount of 0.01 to 10 wt. % was added and the reaction mixture was polymerized at a temperature in the range of 120–170° C. for a time in the range of 15 minutes to 4 hours. The polymerized reaction mixture was then filtered through a syringe filter and precipitated into a selected solvent, for example, absolute ethanol. The polymer was collected by filtration and dried under vacuum. Where the various "R" groups ($R_1$, $R_2$, $R_3$, $R_4$ or $R_5$) are alkyl groups, halogenated "R" groups can be used in practicing the invention. Chlorine and fluorine are the preferred halogens in such instances. Thus the halogen atom can be on either the dialkyne compound or the dithiol compound, or both. One or a plurality of halogen atoms can be present on any "R" group.

The polymerization initiators used in practicing the invention are free radical initiators, either thermal or photochemical, known in the art, with thermal initiators being preferred. Examples of free radical initiators which can be used in practicing the invention include, without limitation, nitrile initiators (for example, AIBN), benzoyl peroxide, 1,1'-azobis(cyclohexanecarbonitrile), and organic peroxides, for example TRIGINOX® 101 (Akzo Nobel), and other peroxy initiators (for example, diacyl peroxides, dialkyl peroxydicarbonates, tert-alkyl polyesters, di(tert-alkylperoxy)ketals, ketone peroxides and alkyl hydroperoxides), and similar initiators known in the art, and combinations thereof. Examples of photoinitiators which can be used in practicing the invention include, without limitation, Irgacure 1173 (Ciba Specialty Chemical), ESA-CURE® KTO46 (a blend of phosphine oxide, α-hydroxy ketone and a benzophenone derivative available from Sartomer, of Exton, Pa.); 2-hydroxy-2-methyl-1-phenylpropan-1-one; benzodimethyl ketal; 1-hydroxycyclohexyl phenyl ketone; 1-hydroxycyclohexylphenyl ketone [e.g., Irgacure 184 (Ciba Specialty Chemical, Tarrytown, N.Y.), bis(2,6-dimethoxybenzoyl)-2,4,4-trimethylpentyl phosphine oxide (e.g., in commercial blends of Irgacure 1800, 1850, and 1700, Ciba Specialty Chemical), 2,2-dimethoxyl-2-phenyl acetophenone (e.g., Irgacure 651, Ciba Specialty Chemical), bis(2,4,6-trimethylbenzoyl)phenyl phosphine oxide (e.g., Irgacure 819, Ciba Specialty Chemical), (2,4,6-trimethylbenzoyl)diphenyl phosphine oxide (e.g., in commercial blend Darocur 4265, Ciba Specialty Chemical), 2-hydroxy-2-methyl-1-phenylpropane-1-one (e.g., in commercial,blend Darocur 4265, Ciba Specialty Chemical) and combinations thereof.

The vinyl sulfide compounds of general formula —(—$R_1$—S—$R_4$C═C$R_5$—$R_3$—S—)$_n$—(—$R_2$—S—$R_4$C═C$R_5$—$R_3$—S—)$_m$ may be used to form curable compositions in which said polymer is further homopolymerized or is copolymerized, including being crosslinked, with a second polymerizable monomer, oligomer or polymer. Such polymerizations are carried out in the presence of initiator compound, either thermal or photo, such as those set forth above or otherwise known in the art. When photoinitiators are used, actinic radiation or electron beam radiation is used to "activate" the initiator and begin the polymerization reaction. Optionally, a post-baking step can be included in the polymerization and/or crosslinking involving a second monomer, oligomer or polymer.

Homo- and co-polymerized —(—$R_1$—S—$R_4$C═C$R_5$—$R_3$—S—)$_n$—(—$R_2$—S—$R_4$C═C$R_5$—$R_3$—S—)$_m$ have been found to maintain their optical clarity-after temperature cycling from –40° C. to +85° C. and/or exposure to 85° C. and 85% Relative Humidity ("RH") for a minimum of 500 hours. Further, such homo- and copolymers have an optical loss in the range of 0.1–1.5 dB/cm at 1550 nm and exhibit a refractive index in the range of 1.60–1.75 at 632 nm and 1550 nm.

Crosslinked polymers formed using the vinyl sulfide materials of the invention are resistant to common organic solvents; maintain their optical clarity after temperature cycling from –40° C. to +85° C. and/or exposure to 85° C. and 85% Relative Humidity ("RH") for a minimum of 500 hours; and exhibit a thermal stability of over 250° C. in thermogravimetric analysis. The crosslinked polymers have been found to maintain their optical clarity after aging at 85% RH and 85° C. for times in excess of 1000 hours. In addition, such crosslinked polymers have an optical loss in the range of 0. 1–1.5 dB/cm at 1550 nm and exhibit a refractive index in the range of 1.60–1.75 at 632 nm and 1550 nm.

For the preparation of optical communications elements or devices a composition comprising an initiator compound and a —(—R$_1$—S—R$_4$C=CR$_5$—R$_3$—S—)$_n$—(—R$_2$—S—R$_4$C=CR$_5$-R$_3$—S—)$_m$ compound are combined in the presence of a selected solvent and applied to the surface of a substrate. Optionally, a second monomer, oligomer or polymer can also be included in the composition. The composition is applied to the substrate by any method known in the art; for example, spin coating, spraying, dipping, painting or other known methods. The applied composition is then polymerized in toto or a mask can be applied and selected portions of the composition polymerized. Unpolymerized composition is removed by washing with a selected solvent in which the composition is soluble. Examples of such solvents, without limitation, are chlorinated hydrocarbons, ketones such as acetone or methyl ethyl ketone. ethers such a tetrahydrofuran or glyme, dimethyl sulfoxide, dimethyl sulfone, and carbon disulfide. Subsequently, such additional steps as necessary to prepare the desired element or device can be carried out.

The vinylic compounds —(—R$_1$—S—R$_4$C=CR$_5$—R$_3$—S—)$_n$—(—R$_2$—S—R$_4$C=CR$_5$—R$_3$—S)$_m$ can be copolymerized with any second monomer, oligomer or polymer material capable of reaction with the vinylic double bond. Acceptable monomer, oligomer or polymer materials are, but are not limited to, acrylates, methacrylates, thioacrylates, thiomethacrylates, acrylamides, vinyl ethers, vinyl sulfides, propenyl ethers, maleimides, maleates, itaconates, crotonates, N-vinyl amides, styrenes, divinylbenzene and allyl ethers. The vinyl compounds of the invention can also be crosslinked by reaction with any second monomer, oligomer or polymer, including those specifically named above, that contains two moieties capable of reacting with the carbon-carbon double bond. For example, diacrylates, dimethacrylates and divinyl benzene. For the preparation of optical communications devices and elements, the second polyrherizable material is mixed with the vinylic compounds of the invention and the initiator compounds, coated on a substrate and polymerized as described above. Halogenated second monomers, oligomers or polymers can be used in the foregoing polymerizations. The preferred halogens are chlorine and fluorine, or mixtures thereof; and one or a plurality of halogen atoms may be present.

The following Examples are given to provide a further overview or framework for understanding the nature and character of the invention as it is claimed, and it is to be understood that the invention is not limited to the specific materials used in the following Examples.

EXAMPLE 1

Synthesis of Bis[4-(1-propynylthiophenyl)]sulfide [BPTMS (I)]

Scheme 1.

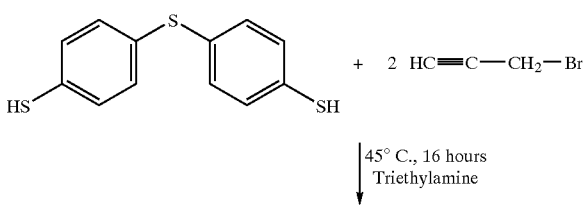

45° C., 16 hours
Triethylamine

-continued

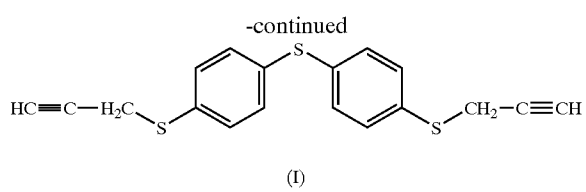

(I)

300 g (1.2 mol) bis(4-mercaptophenyl) sulfide (MPS, Sumitomo Seika), 1000 ml anhydrous tetrahydrofuran, and 384 g (3.0 mol) of triethylamine were placed into a 3000 ml three-necked flask equipped with mechanical stirrer, condenser, addition funnel and a nitrogen bubbler. After purging the solution with nitrogen, 384 g (2.6 mol) of 80% propargyl bromide/toluene solution was added in dropwise at room temperature with vigorous stirring. The reaction mixture was then mixed at 300 rpm and the temperature increased to rise 45° C. for 16 hours. The slurry was poured into 4L de-ionized ice water. The mixture was then put into a freezer at −10° C. until the organic phase and water phase completely separated. The yellowish organic layer was washed with water twice and then dried over anhydrous magnesium sulfate before rotary evaporation. The crude product was dissolved in 3000 ml 1:1 cyclohexane/ethyl acetate solvent and run through a silica gel column twice to obtain 220 grams of a slight yellowish flaked product after removing the solvents. The products were crystallized in methanol at −20° C. to yield snow white crystal products with purity of 98.7% (HPLC). The melting point of bis[4-(1-propynylthiophenyl)]-sulfide (BPTPS) was 37–39° C. The refractive index was 1.6840 at 589 nm.

EXAMPLE 2

Synthesis of BPTMS/MPS Polymer

In a degassed Pyrex glass tube, 13.26 g (0.04 mol) bis[4-(1-propynylthiophenyl)] sulfide (BPTPS, monomer), 10.00 g (0(04 mol) bis(4-mercaptophenyl) sulfide (MPS, monomer), were dissolved into 36 grams of dichlorobenzene under a nitrogen atmosphere. Then, 0.18 g 2,5 dimethyl-2, 5-di-(tert-butylperoxy) hexane (thermal initiator, Trigonox 101) radical initiator was added in monomer solution. The polymerization was carried out at 145° C. oil bath for 45 minutes. The solution was run through a 0.2 μm syringe filter and precipitated in absolute ethanol. The solid polymer was collected by suction filtration after washing with ethanol. The polymer was dried in a vacuum oven at room temperature for 3 days to yield 21 grams of polymer.

Using similar reaction method as above; different monomers, solvents, thermal initiators, polymerization temperatures and polymerization times were tested to study the polymerization behavior.

UV photochemical polymerization of BPTPS/MPS (50 wt. % in THF) was carried out in a 250 ml flask equipped with a mechanical stirrer. Depending on the UV power intensity and concentration of initiator, the polymerization, was performed at room temperature (18–25° C.) under nitrogen atmosphere for 1–2 hours. When small amounts of initiator are used and/or UV power is low, the reaction mixture may be heated to a temperature in the range 40–70° C. As previously stated, initiator concentrations are in the range of 0.1 to 10 wt. % of the reactive components.

Characterization of Materials

FTIR:

FTIR spectra were collected on a Mattson Satellite 2000 spectrometer at 4 cm$^{-1}$ resolution with 32 scans. The FTIR specimens were prepared by spin-coating the polymer (monomer) on a KBr crystal or a double polished silicon wafer.

NMR:

All experiments were recorded on a Varian Unity INOVA 300 MHz spectrometer. Monomer and polymer material were placed in a 5 mm NMR tube and dissolved in tetrachloroethane-$d_2$ at room temperature. All samples were frequency-locked to tetrachloroethane-$d_2$ and referenced to the residual solvent carbon and hydrogen signals. One dimensional $^1$H and $^{13}$C{$^1$H} single pulse experiments were obtained with a $\pi/2$ pulse and a 30 second receiver delay between pulses permitting a quantitative evaluation of the stereochemistry and structural composition. Correlation Spectroscopy (COSY) and Total Correlation Spectroscopy (TCOSY) experiments provided hydrogen coupling information essential for end group and polymer microstructure analysis. Resolution in the second dimension was achieved with 512 $t_1$ increments and the number of transients acquired was 16 scans. Pulsed field gradient Heteronuclear Single Quantum Correlation (gHSQC) and pulsed field gradient Heteronuclear Multiple Bond Correlation (gHMBC) experiments established one bond and multiple-bond hydrogen-carbon connectivity, respectively. The 2D heteronuclear experiments were run using a proton sweep width of 4507 Hz and a carbon sweep width of 18099 Hz, with 512 $t_1$ increments and 32 scans/increment.

Material Properties

Thermal properties were evaluated by thermal mechanical analysis (TMA) and thermal gravimetric analysis (TGA) at a heating rate of 20° C./min under air. Optical loss was measured by transmission spectra from an UV-NIR spectrometer (Perkin-Elmer 9000). The channel waveguide loss of silicon chip was measured by the cut-back method on a fiber-chip-lens setup. The refractive index at 632 nm and 1541 nm were determined from a Metricon 2010 prism coupler.

Following a typical $SN_2$ mechanism, the reaction of bis(4-mercaptophenyl) sulfide with propargyl bromide is very smooth in a triethylamine/THF solution. The yield of bis[4-(1-propynylthiophenyl)] sulfide (BPTPS) is ~70% without optimizing the reaction conditions. However, if we use a strong base, such as potassium tert-butoxide, an insoluble dark brownish product was obtained as some side reactions occur from polymerization and oxidation. The FTIR spectrum (FIG. 2) of the prepared monomer-showed a strong absorption peak at 3290 cm$^{-1}$ from C—H stretch vibration on acetylene group. The characteristic triple bond carbon-carbon stretch at 2118 cm$^{-1}$ also supported the coupling reaction shown in Scheme 1.

The successful synthesis of the BPTBS was confirmed in the $^1$H spectrum upon observing the —CH$_2$S as a triplet resonating at 3.58 ppm. Signature $^{13}$C NMR chemical shifts of the —C≡CH end-group were observed at 72.04 and 79.06 ppm. These unambiguously confirm that the structure of BPTPS is as shown above. Table 1 summarizes each carbon and hydrogen chemical shift that agrees with the proposed structure. Impurities were detected in the BPTPS final product at less than 1 mol % by NMR analysis. HPLC also confirmed the purity of BPTPS is over 98.7%.

TABLE 1

$^1$H and $^{13}$C NMR Chemical Shift Assignments of bis[4-(1-propynylthiophenyl)]sulfide (BPTPS)

| Proton | δ (ppm) | Multiplicity | Integral | Carbon | δ (ppm) | Multiplicity | Integral |
|---|---|---|---|---|---|---|---|
| H1 | 2.26 | triplet | 2H | C1 | 72.04 | doublet | 2C |
| H2 | — | — | — | C2 | 79.06 | quaternary | 2C |
| H3 | 3.58 | doublet | 4H | C3 | 22.29 | triplet | 2C |
| H4 | — | — | — | C4 | 133.85 | quaternary | 2C |
| H5 | 7.24 | doublet | 1H | C5 | 131.29 | doublet | 2C |
| H6 | 7.24 | doublet | 1H | C6 | 131.29 | doublet | 2C |
| H7 | 7.34 | doublet | 1H | C7 | 130.85 | doublet | 2C |
| H8 | 7.34 | doublet | 1H | C8 | 130.85 | doublet | 2C |
| H9 | — | — | — | C9 | 134.16 | quaternary | 2C |

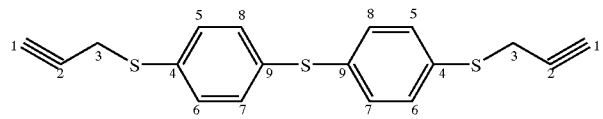

The radical polymerization results from equal molar amounts of BPTPS and MPS prepared under different conditions were summarized in Table 2. First, the polymerization was done under typical radical polymerization conditions by using AIBN as an initiator at 65° C. (Run #1). However, after 8 hours polymerization, no high molecular weight polymer was observed after precipitating from acetone. Only a small amount of polymer (<10 wt. %) was obtained when we increased the reaction temperature to 90° C. by using the BPO as initiator. When the polymerization temperature was increased beyond 105° C., the polymerization yield significantly increased. For example, over 90% of the polymer can be recovered when the polymerization temperature was 135° C. for 2.5 hours (see Run #4 and Run #5). All of the synthesized polymers have good solubility in THF, chlorobenzene and dichlorobenzene. Moreover, the polymers are only partially soluble in mesitylene, hardly soluble in acetone and insoluble in ethanol and hexane.

Figure 2:
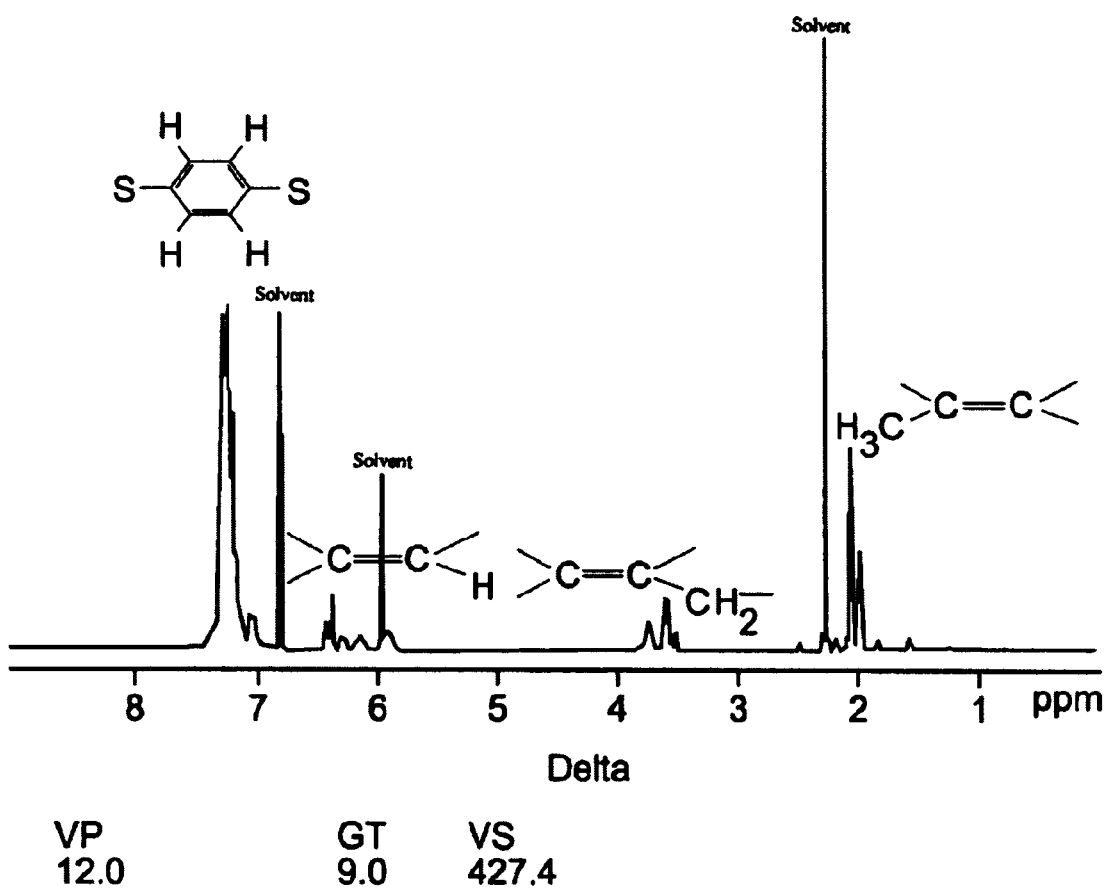
FIG. 2 illustrates the $^1$H NMR spectrum of radical polymerization products of BPTPS and MPS.

Experiments on radical polymerization of BPTPS/MPS via. UV radiation was also carried out in Run #6 (Table 2). After 4 days of polymerization in a Pyrex flask under a black-light lamp, the polymer solution became viscous and 73% solid polymer was recovered from the solution. FTIR spectra of BPTPS monomer and polymer are shown in FIG. 2. After polymerization, the carbon/carbon triple bond related peaks in BPTPS at 3290 cm$^{-1}$ 2118 cm$^{-1}$, 640 cm$^{-1}$ have almost completely disappeared. The —S—H stretch at 2551 cm$^{-1}$ in MPS is also diminished as the polymerization progressed. The new peaks in the polymer spectrum at 772 cm$^{-1}$, 904 cm$^{-1}$ and 942 cm$^{-1}$ are olefinic hydrogen deformation mode stretches. This is evidence of the step growth reaction between thiol and propynyl groups. No crosslinked polymer was found in dichlorobenzene solution at our given polymerization condition. Hence, the dithiol/dipropynyl radical addition polymerization is selective in that the thiol functional group reacted with only one of the unsaturated carbon-carbon bonds in the propynyl group. Further polymerization is expected to give a branched or crosslinked polymer.

TABLE 2

The Radical Addition Polymerization Results of BPTPS/MPS at Different Polymerization Conditions.

| Run No. | Monomer BPTPS/ MPS (mmol) | Solvent (g) | Initiator (mg) | Temp. (° C.) | Yield (%) | Polymer Microstructure (%) | | | |
|---|---|---|---|---|---|---|---|---|---|
| | | | | | | Markovnikov | | Anti-Markov. | |
| | | | | | | Z | E | Z | E |
| #1 | 20/20 | Toluene (30) | AIBN (120) | 65 | ~0 | | | | |
| #2 | 20/20 | Mesitylene (30) | BPO (120) | 90 | ~10 | | | | |
| #3 | 20/20 | Mesitylene (30) | BPO (120) | 100 | 62% | 62.9 | 21.0 | 7.4 | 8.7 |
| #4 | 40/40 | Mesitylene (30) | Trigonox 101 (240) | 135 | 90% | 36.0 | 18.5 | 20.9 | 24.6 |
| #5 | 40/40 | Dichlorobenzene (30) | Trigonox 101 (240) | 135 | 92% | | | | |
| #6 | 20/20 | THF (30) | Irgacure 1173 (120) | 20 | 73% | | | | |

The polymerization of acetylenic compounds, for example, BPTMS, and dithiol compounds, for example, MPS, has not been thoroughly investigated and the polymerization mechanisms by which such reactions proceed have not been thoroughly reported. Consequently, extensive studies were undertaken to determine the polymerization mechanism by observing polymerization behavior and polymer microstructure.

FIG. 2 is a typical $^1$H spectrum for the CPTPS/MPS polymer. The peak identities are the phenyl protons (7.0–7.4 ppm), olefinic protons (5.8–6.5 ppm), methylene protons (3.5–3.9 ppm) and the methyl protons (1.9–2.1 ppm). By spectrometer integration, it was determined that the ratio of the methyl group and related olefinic protons is 3:1. The intensity between methylene group and related olefinic protons is 1:1. Thus, the polymer backbone consists of olefin units resulting from the radical polymerization mechanism shown in scheme 2 where both E and Z configurations exist in the polymer chain.

The following reaction Scheme 2 illustrates the polymer chain structure of free addition polymerization of BPTPS/MPS. The two types of products are the result of Markovnikov and anti-Markovnikov addition polymerization reactions.

Scheme 2.

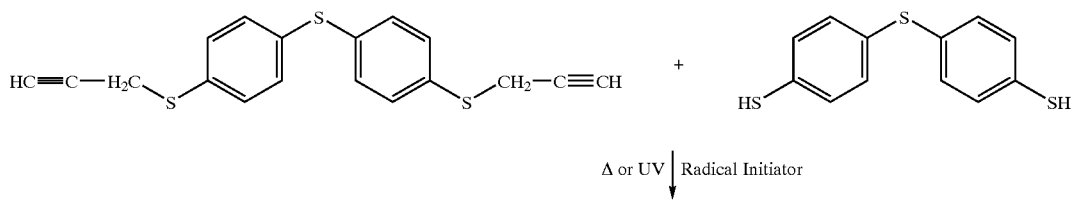

Δ or UV | Radical Initiator

-continued

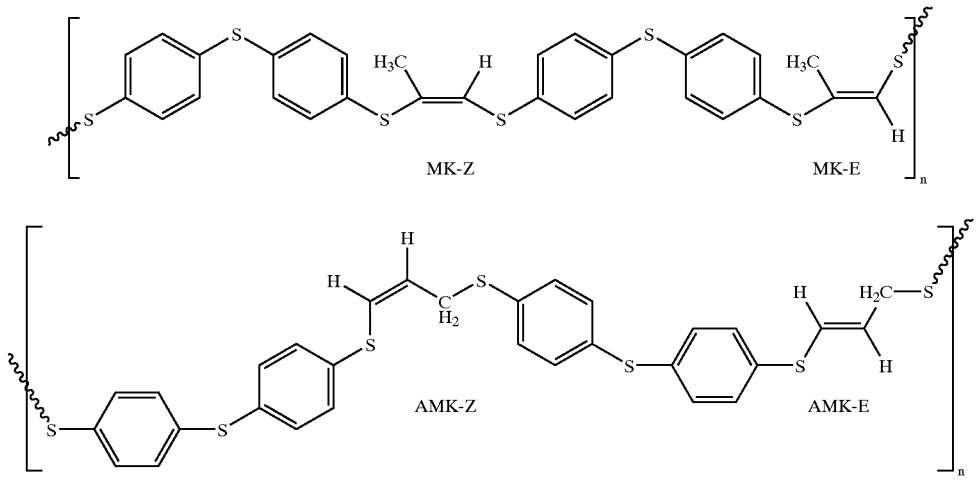

Figure 3:
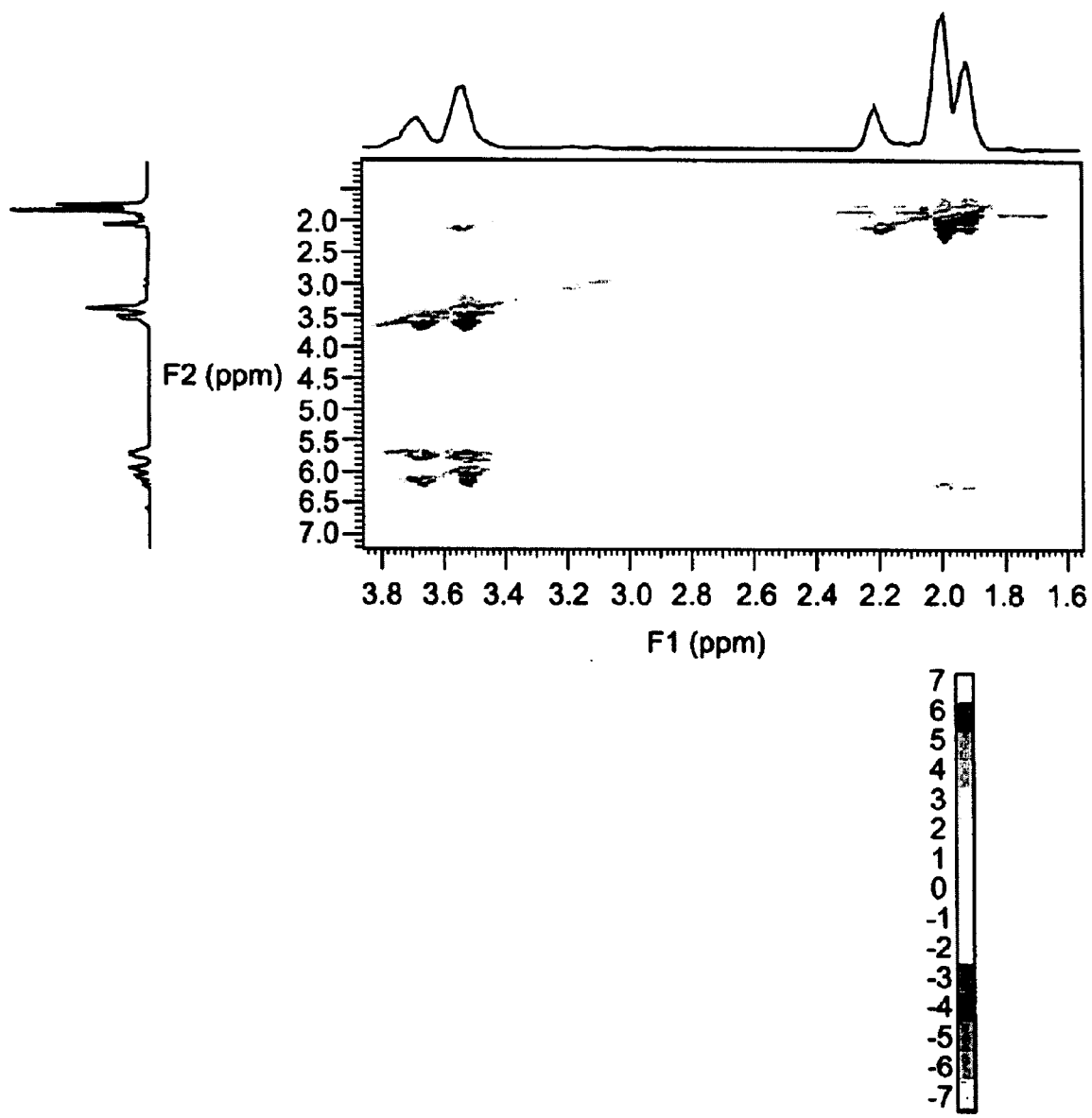
FIG. 3 illustrates the Total Correlation Spectroscopy (TOCSY) spectrum of Markovnikov and Anti-Markovnikov olefin products.

To explain the observed polymer microstructure, a polymerization mechanism is proposed in FIG. 3 from two major routes (Scheme 3, Route 1 and Route 2). Initially, a complex between thiol and 1-alkyne is formed as supported by the FTIR spectra of 1:1 molar mixture of BPTPS and 2-mercaptoethyl. sulfide (MES). In these spectra, the hydrogen stretches from S—H, and ≡C—H increase 8 cm$^{-1}$ and 2 cm$^{-1}$ respectively, an indication of weak bond strength. Therefore, these bonds are involved in the initiating step (I) and step (II), forming a thiophenyl radical as with most of thiol-ene chemistry. Next, the radical attacks the C—H group in the triple bond to form the addition radical product (III.a). Then the radical is transferred back to the thiophenyl group and an Anti-Markovnikov unit is produced. The polymer microstructure formed by a radical transfer reaction to thiol is much more complicated because of a re-arrangement reaction resulting in a bis[4-(1-allenethiophenyl)] sulfide (BATPS) intermediate (III.b). We calculated from the molecular modeling (MM2) structure in CS Chem Office (CambridgeSoft) that the energy difference between BPTPS and BATPS is only 2.15 KJ/mol at 413K (140° C.). Finally, after the radical transfer reactions from (III.a) and (III.b) to thiol group, both Markovnikov and Anti-Markovnikov addition polymerization products are found in the chain propagation process. Because of the random radical transfer process, both E and Z configurations should exist in polymer chain as Schemes 2 and 3.

Scheme 3
Radical Polymerization Mechanism of BPTPS/MPS

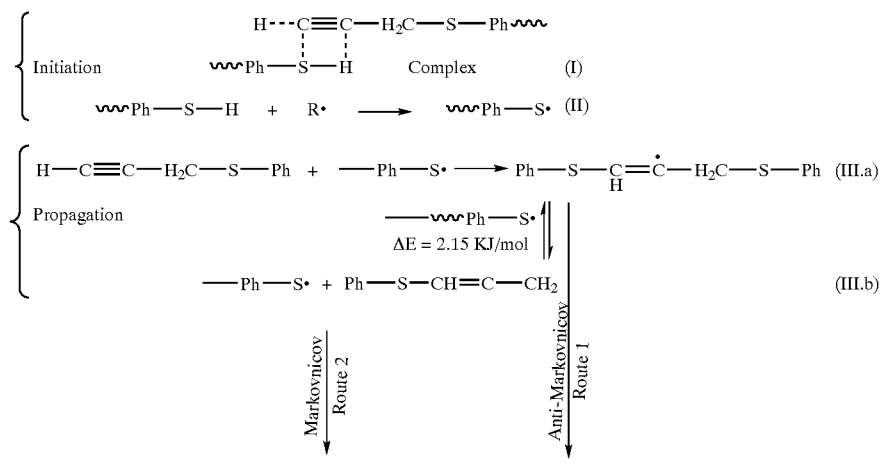

-continued

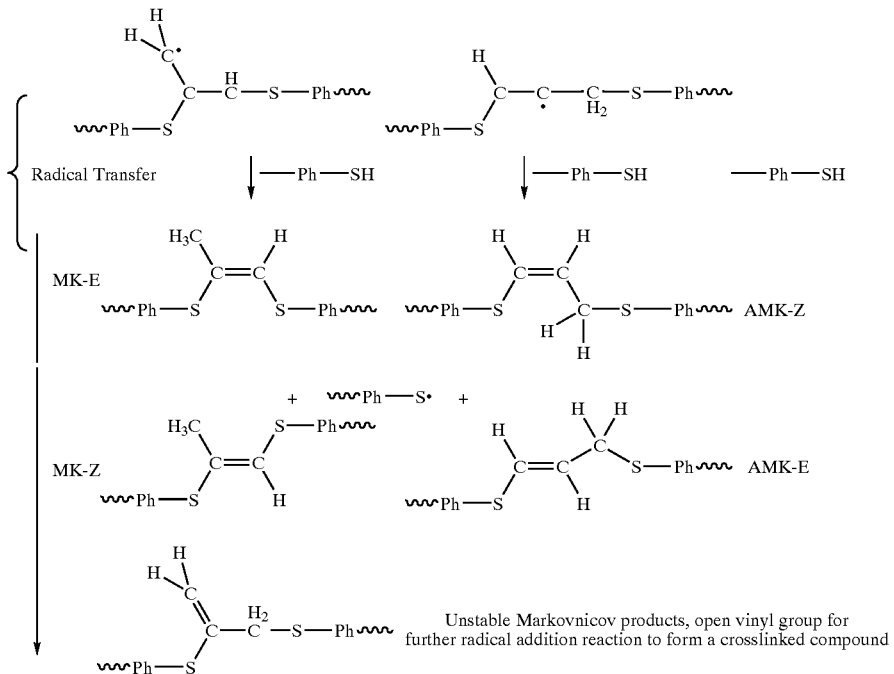

Cahn-Ingold Prelog nomenclature defines Z as the configuration when two groups of higher priority are on the same side of the double bond. Conversely, E is defined as the configuration when two groups of higher priority are on opposite sides of the double bond. The final structure of different conformations of the polymer was assigned in Scheme 2.

Total Correlation Spectroscopy (TOCSY) determined the Markovnikov (MK-Z. MK-E) and Anti-Markovnikov E/Z (AMK-E, AMK-Z) chemical shift assignments by mapping the complete spin system of methyl groups coupled to olefinic hydrogen in the Markovnikov arrangement and the thiomethylene coupled to olefinic hydrogen in the Anti-Markovnikov arrangement. The methylene groups of the Anti-Markovnikov configuration are found at δ(3.5 ppm) and the methyl groups of the Markovnikov configuration appear at δ(2.0 ppm). The —HC=C(CH₃) Markovnikov assignments were guided by empirical calculations of the olefin hydrogen chemical shifts derived from theoretical shielding constants (Pascual, 1966). Cahn-Ingold Prelog assignments were made in the Anti-Markovnikov case by measuring the HC=CH coupling and observing that the $J_E$ coupling constant is larger than the $J_Z$ (Scheme 4).

Scheme 4. Structure and Empirical Calculation of the Markovnikov Olefin Chemical Shift and Its TOCSY Spectrum. (See FIG. 3 for the spectrum).

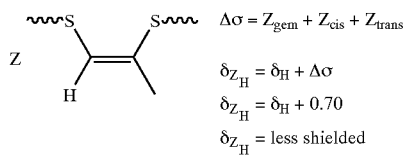

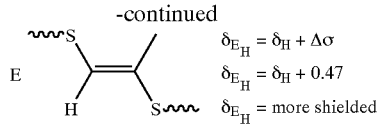

The calculated assignments for the Markovnikov products also agree with the literature data reported by Hideyoshi Miyake from the similar model compounds ("Free radical addition of thiophenol to 3-substituted 1-alkyne with and without migration of substituents", Bull. Chem. Soc. Japan (1988) 61(10), 3752–54). The methyl chemical shift of Z-1,2 bis(phenylthio)-1-propene, and E-Z-1,2 bis(phenylthio)-1-propene is 2.05 and 1.95 respectively.

Figure 4A:
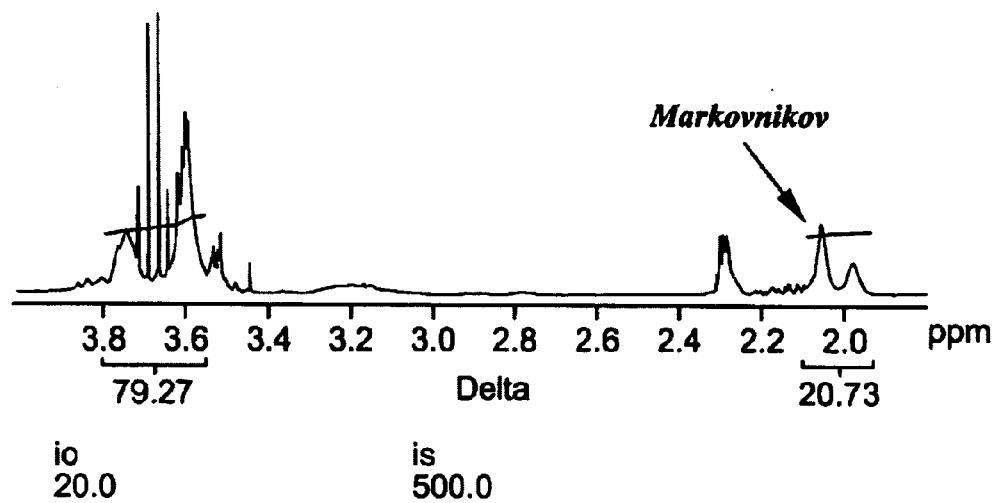
FIG. 4a illustrates the 1H NMR spectrum of the Anti-Markovnikov dominated polymer products formed by the reaction at 100° C.
Figure 4B:
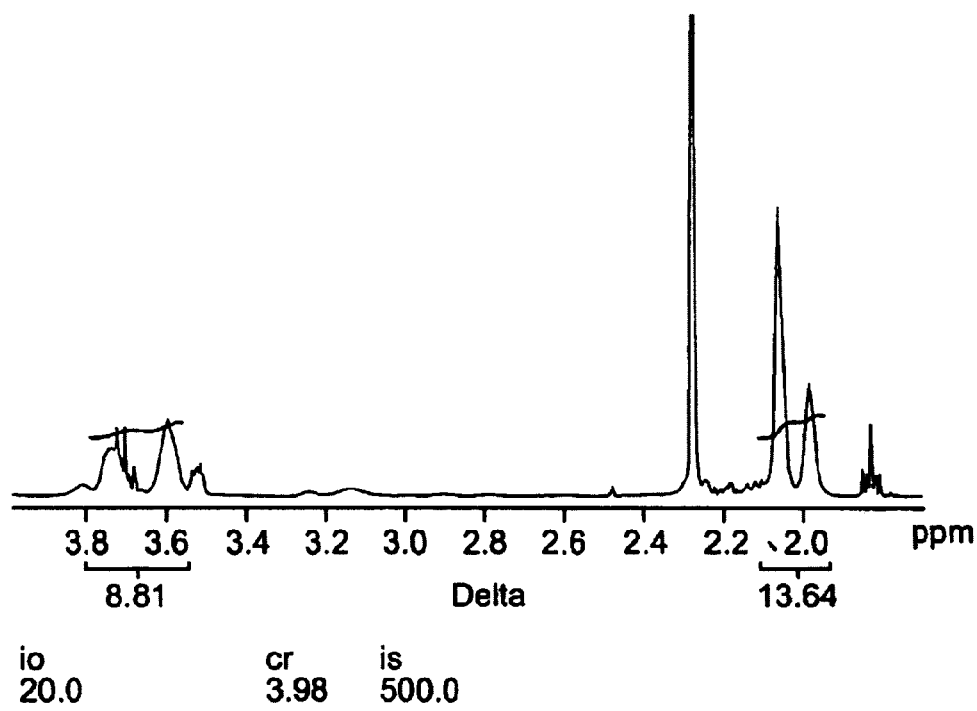
FIG. 4b illustrates the 1H NMR spectrum of the Markovnikov dominated polymer products formed by the reaction at 135° C.

From a material design viewpoint, vinyl sulfide groups within the microstructure of the polymer can be crosslinked by further reaction in the presence of a cationic initiator. To optimize the photosensitivity and contrast for a better photolithographic performance, we manipulated the microstructure of the polymer by changing polymerization conditions such as temperature and reaction time. FIGS. 4a and 4b illustrate the ¹H NMR spectrum of the alkyl polymer composition after 2.5 hours polymerization at 100° C. and 135° C. As shown in the ¹H NMR spectra in FIG. 4a, after free radical polymerization for a period of 2.5 hours at 100° C., the polymer microstructure composition favors Anti-Markovnikov. Molar composition calculations of the thiomethylene groups in the Anti-Markovnikov configuration compared to the methyl groups in the Markovnikov configuration established an 83.9/16.1 molar ratio. In the Anti-Markovnikov arrangement the predominant stereochemistry was found to be the E configuration.

Increasing the reaction temperature to 135° C. while maintaining the same polymerization reaction time of 2.5 hours resulted in a polymer whose composition favored the Markovwikov rearrangement. The mole percent composition of the Markovnikov (MK) to Anti-Markovnikov (AMK) was 54.5 mol % and 45.5 mol %, respectively (FIG. 4.a). In the Markovnikov arrangement the predominant stereochemistry was found to be the Z configuration (FIG. 4.b). The relative ratio between Z and E configuration in the MK products is 54/46 and 66/34 at 100° C. and 135° C., respectively. However, the Z/E from AMK configuration is 25/75 at 100° C., and 44/56 at 135° C. It is easy to understand that the relative higher concentration of MK-Z, and AMK-E attributed to its lower conformation energy, if the larger substituent phenyl groups are bonded at separate side of vinyl groups (Scheme 3).

From the polymerization mechanism in Scheme 2, the dependence of the polymer microstructures on the reaction temperature can be explained. The Anti-Markovvnikov configuration was formed during the reaction step (III.a) and (III.b) after initiation reaction. However, the Markovnikov product was produced only in step (III.b), in which higher activation energy is required. From the experimental NMR data of the relative concentration of MK/AMK at different temperatures, we are able to calculate the activation energy difference between two configurations based on Arrhenius equation.

$$(k_{MK-TI}/k_{AMK-TI})/(k_{MK-TI}/k_{AMK-TI}) = e^{-\frac{\Delta E_{MK-AMK}}{R}(1/T_1 - 1/T_2)}$$

$$(16.1/83.9)/(45.5/54.5) = e^{-\frac{\Delta E_{MK-AMK}}{8.31}(1/373 - 1/418)}$$

The activation energy difference $E_{(MK-AMK)}$ between MK configuration and AMK configuration is 2.92 KJ/mol. This value of activation energy difference value, like most chemical reactions, is 36% higher than the energy difference (2.15 KJ/mol) between BPTPS and BATPS calculated from molecular modeling. Therefore, our experimental results support the hypothesis that an intermediate compound bearing allene groups was formed during the polymerization in reaction step (IV). The higher activation energy of AMK configuration leads to a relatively higher concentration under higher polymerization temperature.

Polymerization Reaction Time Influence on Microstructure

At the polymerization temperature of 135° C., the polymer composition consistently favored the Markovnikov arrangement. After a 1.5 hour polymerization reaction time period the Markovnikov mole percent composition was found to be 57.4 mole %. When the polymerization period was extended to 2.5 hours the Markovnikov composition was 58.4 mole %. Like most of radical polymerizations, the molecular weight increases with polymerization time. As the polymer viscosity increases it becomes more difficult to make a thin film from the polymer solution by the spin-coating process, particularly if the polymerization lasted more than 4 hours at 135° C. Unexpectedly, when the reaction proceeded for 2.5 hours, and the recovered solid polymer was dried in a vacuum oven at 60° C. overnight, the material became intractable. This indicates a crosslinked structure was formed after polymerization. The Anti-Markovvnikov configuration products of the low temperature polymerization reaction are less unstable. In contrast, the polymeric material prepared at higher reaction temperature (145° C.) and stored in the refrigerator is much more stable. This phenomenon is most likely related to some further reactions occurring with the end groups in addition to our proposed polymerization mechanism.

Unstable Markovnikov Addition Products with Exposed Vinyl Group

Figure 5:
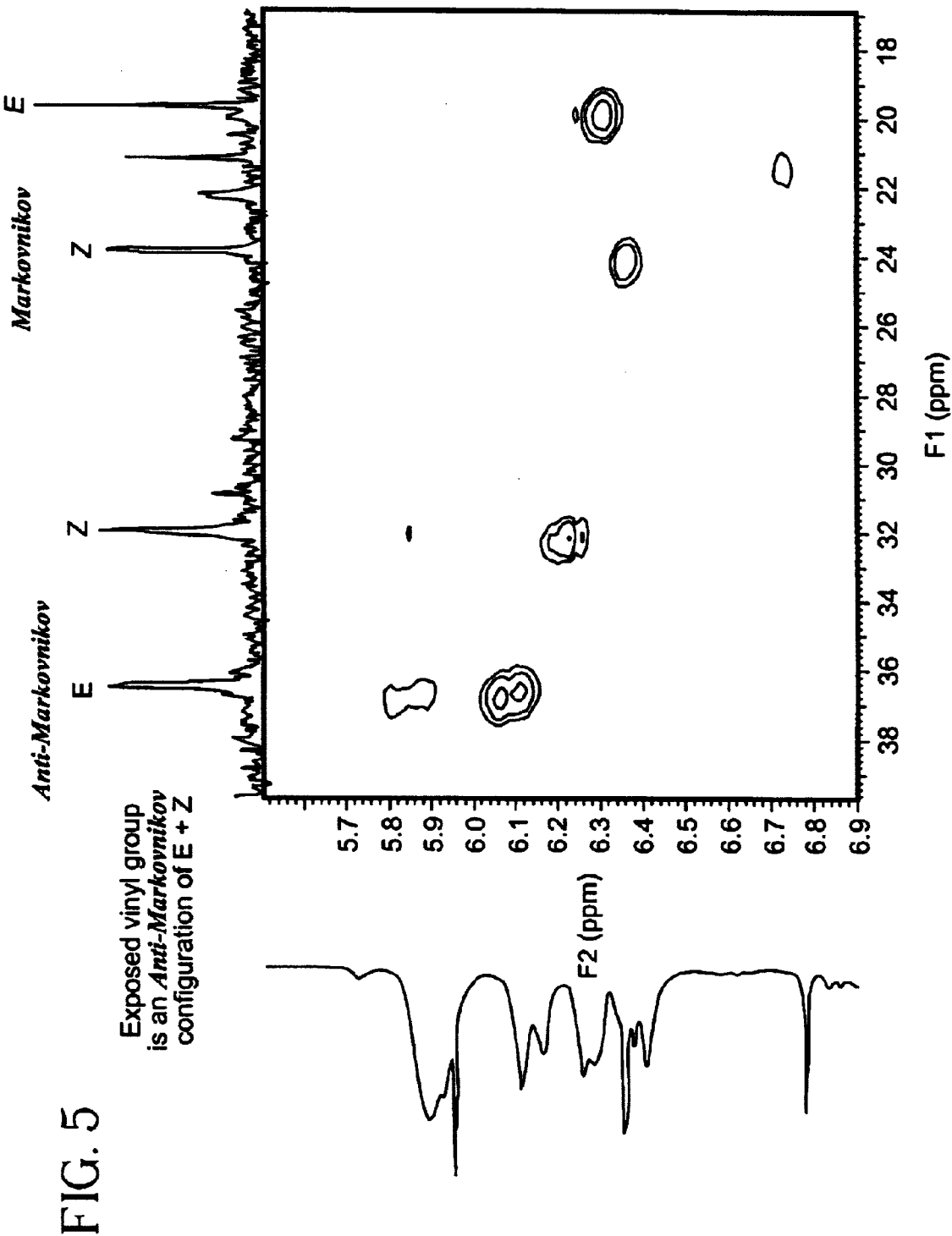
FIG. 5 illustrates the $^1$H—$^{13}$C{$^1$N} HMBC of exposed vinyl groups in the Anti-Markovnikov configuration.

The $^1H$—$^{13}C$ HMBC (FIG. 5) also revealed the presence of an exposed vinyl group primarily observed in the E configuration of the Anti-Markovnikov rearrangement. Vinyl groups extended from the backbone will preferentially react faster than the vinyl functional groups that are in the plane of the polymer backbone. The extended and exposed vinyl groups are less stable, hence potentially contributing to premature crosslinking as observed in polymer materials under extended reaction time conditions (3 hours) at 135° C.

From ESR studies by S. Sensfuss et al. (Makromol. Chem. (1991), 192(12), 2895–2900), it is believed that the —SH groups can react with vinyl groups in solid state and in an oxygen environment even in the absence of light and initiator. Therefore, it is believed that the end groups that did not participate in the initial free radical addition polymerization may attack the vinyl sulfide double bond in Markovnikov and Anti-Markovnikov sites on the polymer backbone in the solid state to form a non-soluble crosslinked network. The terminal thio and the alkyne functional groups in the product polymerizing at a temperature of 135° C. were seen in a $^1H$—$^{13}C\{^1H\}$ HMBC experiment. Heteronuclear correlations emanating from the terminal alkyne end group of 4,4-thiobisbenzenethiolyne and the —SH ends of 4,4-thiobisbenzenethiol were detected. The HMBC correlations in 4,4-thiobisbenzenethiolyne appear at δ(3.54H, 72.04C) and δ(3.54H, 79.06). Also observed is a thiomethylene hydrogen correlating to the —C≡CH. Evidence for the presence of —SH which is indicative of residual 4,4-thiobisbenzenethiol appeared at δ (3.5H, 133C).

Optical Applications

Most polymer optical materials are crosslinked to form a network structure for better thermal, environmental and mechanical stability. It is well known that the vinyl sulfide group undergoes a cationic polymerization in the presence of a Bronsted acid. Sato et al (Macromolecules (1993), 26(19), 5185–6) reported the synthesis of a radical polyaddition polymer from a 1,4-bis(allenyloxy)benzene with bis (4-mercaptophenyl) sulfide. This polymer contains pure Markovnikov addition microstructure similar to our mechanism in scheme 2. Its main-chain vinyl double bone can be crosslinked by a Lewis acid in solution. Therefore, one important property in the design of the vinyl sulfide backbone containing polymer from BPTPS/MPS is that the material should be photocurable with a photoacid generator (cationic initiator).

The cationic curing experiments of BPTPS/MPS polymer were carried out in a 5 μm thick polymer film, which is prepared by a spin-coating process using a dichlorobenzene (DCB) solution with 1 wt % photoacid initiator (CD1012, or GE 2092). After UV radiation at 100 mJ/cm² and postbaking at 130° C. for 10 minutes, the polymer film is completely crosslinked. The crosslinked polymer is insoluble in THF, DCB and any organic solvents. The non-photo-imaging area remains soluble in THF and DCB because of the lack of photoacid initiator. This highly photosensitive crosslinking reaction renders a possible direct photolitho-graphic process for fabricating low cost, high quality polymer waveguides.

To understand the chemical reaction of the crosslinking process, FTIR spectroscopy was used to follow the deposition of a BPTPS/MPS polymer film on a KBr crystal. Following the initial control FTIR spectrum, subsequent FTIR spectra were run after UV radiation+postbaking. The differential FTIR spectrum of the BPTPS/MPS polymer film sample revealed that the curing reaction had taken place at the vinyl sulfide functional groups. The =C—S stretch peak at 660 cm$^{-1}$ and the =C—H deformation peaks at 751, 772, 904, 942 cm$^{-1}$ became negative after the curing reaction, and the intensity of —C—H stretch at 2845 and 2880 cm$^{-1}$ increased significantly. Therefore, the crosslinking reaction mechanism is related to the open vinyl sulfide double bonds (Scheme 4). The electron rich vinyl sulfide double bond, =C—S, from MK and AMK addition was attacked by the strong photoacid generated from the UV radiation. The cationic chain propagation across the vinyl sulfide group of the polymer backbone eventually formed a network structure. Detailed information regarding the reactivity of different vinyl sulfide groups was not very clear because at least four different configurations were involved in this crosslinking reaction.

Scheme 4.

Photo Crosslink Mechnism of BPTPS/MPS Polymer

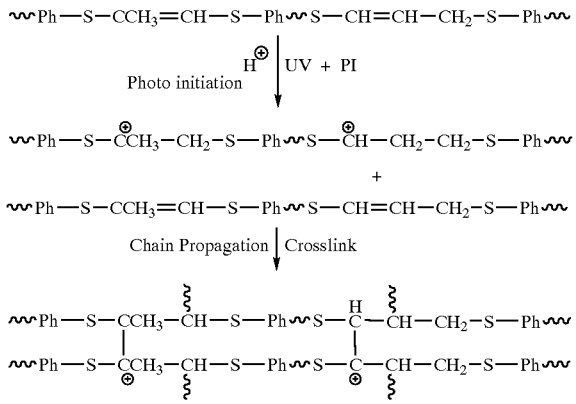

Optical Properties

The photocured polymer film is an amorphous material as determined by polarizing microscopy analysis. The crosslinked material has very low polarization dependence based on refractive index and optical loss measurement. The refractive index of the cured BPTPS/MPS film sample is 1.7080 at 1541 nm and 1.7475 at 632 nm as measured from a Metricon 2010 prism coupler. This refractive index value is very high for an amorphous polymer compared to the reported refractive index values of other polymer materials listed in the "Polymer Handbook". The optical loss of a slab waveguide was also determined from the prism coupler method. The propagation loss is ~0.6 dB/cm at 1550 nm. The calculated transmission loss of BPTPS/MPS polymer is 0.45 dB/cm based on the relative volume concentration of the C—H bond. By changing the MPS to 2,3,5,6-tetrachlorophenyl 1,4-dithiol in reaction scheme 2., we have synthesized a halogenated polymer with the same refractive index as the BPTPS/MPS polymer. More importantly, the calculated optical loss is only 0.3 dB/cm at 1550 nm.

Thermal Properties.

TMA and TSC measured the glass transition temperature of BPTPS/MPS polymer. Before initiating the crosslinking reaction, the polymer film showed only a single glass transition at 35–43° C. After photo-curing and postbaking, the Tg of the polymer film increased from 70 to 140° C., depending on the crosslink degree of vinyl sulfide groups. FIG. 8 is a typical TMA trace of a partially crosslinked BPTPS/MPS polymer. It is a clear that the material has a single glass transition and is an amorphous polymer without any phase separation because all stereochemical configurations are randomly distributed along the polymer backbone. No thermal degradation was observed on the polymer film at temperatures below 200° C. under a nitrogen atmosphere. The change in refractive index was less than ±0.001 after placing the polymer film in an 85% RH/85° C. environmental chamber for 2 weeks. The cured films exhibited excellent solvent resistance to any organic solvent and mechanical scratching. Based on these findings, the fully crosslinked polymer is expected to have good solvent resistance to liquid crystal molecules.

In summary, new monomers bf general formula $HC{\equiv}C-R_3-S-R_2-S-R_3-C{\equiv}CH_2$, for example, bis[4-(1-propynylthiophenyl)] sulfide (BPTPS), can be prepared in accordance with the invention. These monomers can be used to make soluble linear polymers via radical addition polymerization with dithiol. The polymers can be crosslinked by UV radiation in the presence of cationic photo initiator to form a solvent and mechanical scratch resistant network. The material possesses a high refractive index (1.708 at 1541 nm for BPTPS) and high photosensitivity. Therefore, these materials are suitable for fabricating high refractive index waveguides by a direct photolithographic process in order to produce low cost optical device.

It will be apparent to those skilled in the art that various modifications and variations can be made to the present invention without departing from the spirit or scope of the invention. Thus, it is intended that the present invention covers the modifications and variations of this invention provided they come within the scope of the appended claims and their equivalents.

We claim:

1. A linear or essentially liner polymer of general formula

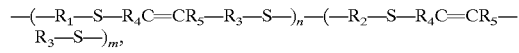

wherein (a) $R_1$ and $R_2$, independently of each other and of $R_3$, are an alkyl group, an aryl group, a dialkyl sulfide group, a diaryl sulfide group or a mixed alkyl-aryl sulfide group, the $R_1$ and $R_2$ alkyl groups being $C_1$–$C_6$ alkyl groups selected independently of each other, and the aryl groups being phenyl and alkyl, deuterium or halogen substituted phenyl groups;

(b) $R_3$ is methylene or a mono-/di-substituted methylene group, wherein said substituent(s) is/are, independently, $C_1$–$C_6$ alkyl groups;

(c) P4 and $R_5$, independently of each other, are H or $CH_3$; and (d) m and n, independently of each other, are integers in the range of 1–1000.

2. The polymer according to claim 1, wherein said $R_1$ and $R_2$ aryl groups are alkyl, deuterium or halogen substituted aryl groups.

3. The polymer according to claim 1, wherein said polymer has a refractive index in the range of 1.60–1.75 at 632 and 1550 nm.

4. The polymer according to claim 1, wherein m and n, independently of each other, is in the range of 1–100.

5. The polymer according to claim 1, wherein said polymer is soluble in chlorinated hydrocarbons, tetrahydrofuran, dimethyl sulfoxide, dimethyl sulfone, and carbon disulphide.

6. The polymer in accordance with claim wherein said polymer is of formula $(-R_1-S-HC{=}CH-R_3-S-)_n-(-R_2-S-R_4C{=}CR_5-R_3-S-)_m$.

7. The polymer according to claim 6, wherein said $R_1$ and $R_2$ are aryl groups and alkyl, deuterium or halogen substituted aryl groups.

8. The polymer according to claim 6, wherein said polymer has a refractive index in the range of 1.60–1.75 at 632 and 1550 nm.

9. The polymer in accordance with claim 1, wherein said polymer is of formula $(-R_1-S-HC{=}CH-R_3-S-)_n-(-R_2-S-HC{=}CH-R_3-S-)_m$.

10. The polymer according to claim 9, wherein said $R_1$ and $R_2$ are aryl groups and alkyl, deuterium or halogen substituted aryl groups.

11. The polymer according to claim 9, wherein said polymer has a refractive index in the range of 1.60–1.75 at 632 and 1550 nm.

12. A curable composition comprising:
(a) a first linear or essentially liner polymer of general formula

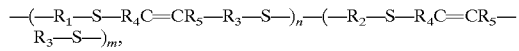

wherein
(i) $R_1$ and $R_2$, independently of each other and of $R_3$, are an alkyl group, an aryl group, a dialkyl sulfide group, a diaryl sulfide group or a mixed alkyl-aryl sulfide group, the $R_1$ and $R_2$ alkyl groups being $C_1$–$C_6$ alkyl groups selected independently of each other, and the aryl groups being phenyl and alkyl, deuterium or halogen substituted phenyl groups;
(ii) $R_3$ is methylene or a mono-/di-substituted methylene group, wherein said substituent(s) is/are, independently, $C_1$–$C_6$ alkyl groups;
(iii) $R_4$ and $R_5$, independently of each other, are H or $CH_3$; and
(iv) m and n, independently of each other, are integers in the range of 1–1000;
(b) optionally, a second polymerizable monomer, oligomer or polymer; and
(c) a thermal or photo polymerization compound.

13. The composition according to claim 12, wherein said second monomer, oligomer or polymer is selected from the group consisting of acrylates, methacrylates, thioacrylates, thiomethacrylates, acrylamides, vinyl ethers, vinyl sulfides, propenyl ethers, maleimides, maleates, itaconates, crotonates, N-vinyl amides, styrenes divinyl benzene, and allyl ethers.

14. The composition according to claim 13, wherein said second monomer, oligomer or polymer contains two moieties capable of reacting with the carbon-carbon double bonds of $-(-R_1-S-R_4C=CR_5-R_3-S-)_n-(-R_2-S-R_4C=CR_5-R_3-S-)_m$ to thereby crosslink said $-(-R_1-S-R_4C=CR_5-R_3-S-)_n-R_2-S-R_4C=CR_5-R_3-S-)_m$.

15. The composition according to claim 12, wherein said $R_1$ and $R_2$ are aryl groups and alkyl, deuterium or halogen substituted aryl groups.

16. The composition according to claim 12, wherein said first polymer is of formula $(-R_1-S-HC=CH-R_3-S-)_n-(-R_2-S-R_4C=CR_5-R_3-S-)_m$.

17. The polymer in accordance with claim 12, wherein said polymer is of formula $(-R_1-S-HC=CH-R_3-S-)_n-(-R_2-S-HC=CH-R_3-S-)_m$.

* * * * *

UNITED STATES PATENT AND TRADEMARK OFFICE
CERTIFICATE OF CORRECTION

PATENT NO. : 6,653,425 B1  Page 1 of 1
DATED : November 25, 2003
INVENTOR(S) : Eyerce L. Armstrong-Poston et al.

It is certified that error appears in the above-identified patent and that said Letters Patent is hereby corrected as shown below:

<u>Title page,</u>
Item [57], ABSTRACT,
Line 7, formula should read -- $HC\equiv C-R_3-S-R_2-S-R_3-C\equiv CH_2$ --
not "$HC\equiv C-R_3-S-R_2\equiv S-R_3-C-CH_2$"

<u>Column 20,</u>
Line 37, should read -- $R_4$ -- not "P4"
Line 53, claim should depend on claim 1, please insert the number 1 after the words in accordance with claim Signed and Sealed this Ninth Day of March, 2004

JON W. DUDAS
*Acting Director of the United States Patent and Trademark Office*